INVENTORS:
Karol L. Hujsak
Myron B. Kratzer
Richard Mungen
BY Everett A. Johnson
ATTORNEY Patented Dec. 2, 1952

2,620,262

UNITED STATES PATENT OFFICE 2,620,262

SYSTEM FOR SYNTHESIS FROM HYDROGEN AND CARBON MONOXIDE WITH FLUIDIZED CATALYST

Karol L. Hujsak, Myron B. Kratzer, and Richard Mungen, Tulsa, Okla., assignors to Stanolind Oil and Gas Company, Tulsa, Okla., a corporation of Delaware Application August 26, 1949, Serial No. 112,554

1 Claim. (Cl. 23—288)

This invention relates to an improved system for effecting synthesis by reacting carbon monoxide with hydrogen in the presence of a fluidized catalyst, and it pertains more particularly to improved method and means for effecting such synthesis with a promoted iron catalyst.

It is known that synthesis may be effected by contacting a mixture of hydrogen and carbon monoxide with a promoted iron catalyst at a temperature of about 650° F. under pressure of about 400 p. s. i. to produce large yields of hydrocarbons higher boiling than methane along with organic chemicals such as acids, alcohols, aldehydes, ketones, esters, etc. The reaction is highly exothermic and in order to provide adequate heat removal and temperature control, extensive research has been conducted with a view toward effecting the synthesis with the catalyst in fluidized condition. This research work on laboratory and pilot plant scale has brought to light a number of unexpected problems and operating difficulties which find no counterpart in other conversion processes employing fluidized solids.

It has been demonstrated in pilot plant investigations that synthesis conversions (i. e. the extent to which carbon monoxide is converted into other products) with promoted iron catalyst is of the order of about 95 to 99% in laboratory operations employing a two-inch reactor, but is only about 60 to 85% in semi-plant designs. This striking difference in extent of conversion can not be readily explained, but it is desired to obtain maximum conversion, i. e. utilization of at least about 95%, and preferably 98% or more, of the carbon monoxide charged. An object of our invention, therefore, is to provide a solution for such problems which will enable the fluidized catalyst system to be employed successfully in large-scale, commercial, synthesis operations.

A further object of the invention is to provide an improved reactor system for effecting synthesis by contacting a hydrogen and carbon monoxide mixture with fluidized synthesis catalyst under conversion conditions. A more specific object is to provide a reactor system which will prevent longitudinal mixing of the fluidized solids from the top to the bottom of the reactor. A further object is to provide improved heat exchange structure which will serve the added function of segregating a multiplicity of separate streams of fluidized solids.

From the process standpoint, an object of our invention is to subject the incoming synthesis gas charge first to reducing conditions and finally to oxidizing conditions within a single reaction zone whereby catalyst disintegration may be minimized. A further object is to provide a method and means for maintaining the catalyst composition in equilibrium with the synthesis gas in a given zone. Other objects will be apparent as the detailed description of the invention proceeds.

We have observed that optimum conversion of gases to useful products can be secured by preventing excess top-to-bottom mixing of the suspended catalyst. The prevention of top-to-bottom mixing of the suspended catalyst results in the catalyst in the lower portion of the bed becoming reduced by the reducing synthesis gas in that zone. On the other hand, the catalyst in the upper oxidizing portion of the reactor becomes oxidized by the gas of lower hydrogen concentration. However, if the catalyst is circulated from top to bottom, reduced catalyst appears in the upper portion of the reactor and oxidized catalyst is found in the lower reducing zone. This results in a catalyst bed which is essentially of uniform oxygen content, thereby causing very substantially diminished yields of the desired end products.

The difference in the extent of top-to-bottom mixing has been demonstrated where comparative runs were made on separate portions of the same batch of catalyst and operated under identical conditions, i. e. the same feed, pressure, temperature, and recycle ratio, but in one case, top-to-bottom mixing was permitted, and in the other, top-to-bottom mixing was avoided according to our invention. Samples of catalyst were taken near the bottom of the catalyst beds and from the catalyst separated from the reaction products. Where top-to-bottom or longitudinal mixing had been permitted, the oxide content of the two samples was found to be 14.4 and 16.3%. In the run where mixing was prevented according to our invention, the oxide content of the catalyst separated from the products was 15.2 and the catalyst sample taken from the lower portion of the catalyst mass was only 5.5%. It is evident, therefore, that in the upper and in the lower zones of the reactor, the catalyst composition is different when top-to-bottom mixing is avoided.

The total feed conversion during comparable periods at 600° F. was found to be about 79% in the case where longitudinal mixing of the catalyst was permitted. However, in the case of the non-mixing catalyst run, about 90% conversion was attained under the same synthesis conditions. Thus, it will be apparent that for optimum conversions in synthesis operations of this kind, it is important to avoid top-to-bottom mixing and thereby provide conditions such that the catalyst is reduced in the lower zone and oxidized, or at least less reduced, in the upper zone. Such operations have obvious economic advantages.

In our reactor, geometrically spaced heat exchange tubes extend between a fixed coolant liquid header (which is at substantially the level of the distributor grid) and upper headers which are free to move up and down in order to take care of thermal expansion and contraction. Vertical fins are secured to the walls of the heat exchange tubes and the tubes are so mounted that the fins of each tube coact with adjacent tubes or fins to form a multiplicity of vertical conduits or segregated flow channels in which columnar bodies of catalyst are retained. The fins do not necessarily contact each other. Small openings or clearances do no harm, and may even be desirable. Coacting vertical fins thus perform several important functions. They provide for more efficient heat transfer from the fluidized solids to the coolant in the tubes. They provide additional surface for taking advantage of any enhancement of conversion due to "wall effect." By preventing lateral catalyst flow they provide a means for preventing top-to-bottom circulation of fluidized solids so that the catalyst in the lower part of the reactor is subject only to reducing conditions while the catalyst in the upper part thereof is under a considerably reduced hydrogen partial pressure.

In order to utilize with maximum effectiveness the catalyst fines which are carried overhead from the upper part of the conversion zone, these fines are centrifugally separated within the upper part of the reactor and are conveyed by one or more cyclone dip legs to a point in the reactor; this enables such fines to be redistributed at the base of each of the channels formed by the vertical fins so that the catalyst in the lower part of said channels may function under optimum fluidization conditions.

In this regard, the catalyst in either of the oxidizing or reducing zones may consist of a mixture of large and small particles or fines. This is especially true where catalyst fines from the upper zone are collected in a cyclone or other suitable separator and returned to the lower portion of the synthesis reactor.

The invention will be more clearly understood from the following detailed description of a specific example of our apparatus and process, which description should be read in conjunction with the accompanying drawings which form a part of our specification and in which.

Figures 1, 2, 3:
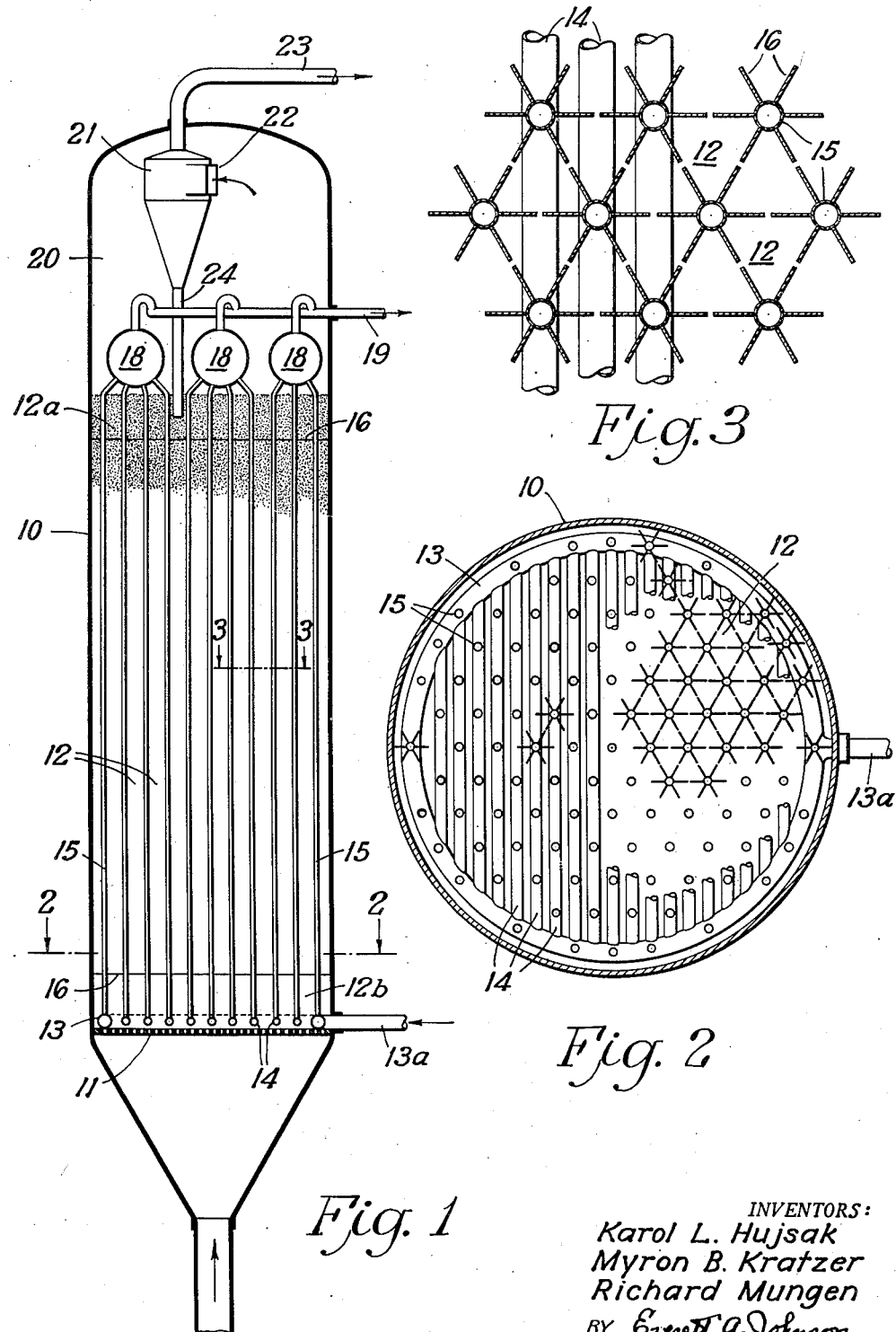
Figure 1 is a schematic vertical section of our improved reactor assembly.
Figure 2 is a section of the reactor assembly taken along the lines 2—2 of Figure 1.
Figure 3 is a horizontal section of a portion of the reactor taken along the lines 3—3 of Figure 1 to illustrate the arrangement of the vertical fins on the heat exchange tubes.

Referring first to the physical structure of our reactor assembly, the vertical reactor 10 may be a cylindrical pressure vessel about 20 feet in diameter by about 60 feet or more in height, the ends of the vessel being provided with closures which may be hemispherical or conical in shape. The distributor grid 11 is mounted at the base of the cylindrical walls and this grid is provided with spaced openings which may be about one-quarter inch in diameter and which are geometrically arranged to provide equal distribution of introduced streams across substantially the entire cross-sectional area of the reactor, i. e. in each of the multiplicity of flow channels 12.

Immediately above the grid 11 a coolant-liquid header 13 is provided; this header may consist of an inlet conduit 13a discharging into parallel distributor conduits 14 of about 1.25 inches outside diameter which may be spaced on approximately 1.75 to 2.0 inch centers. Although the grid 11 is shown as below the header 13, it can be arranged above the header and other configurations of headers can be used. Vertical tubes 15 rise from distributors 14 and are mounted on approximately 3.5 to 4 inch centers to give a geometric pattern such, for example, as the hexagonal pattern illustrated in Figure 3, although square, diamond-shaped, or other patterns may, of course, be employed. With the above spacing, tubes 15 may be approximately one inch in outside diameter, but tubes as large as 2 inches may be used with increased distributor spacing. Each tube 15 is provided with a plurality of radial fins 16 which extend substantially vertically within the reaction zone. The fins 16 in this example may be about three inches in width and they are positioned so that their outer extremities are in close proximity to the outer extremities of fins 16 on adjacent tubes. It will thus be seen (in Figure 3) that the fins provide vertical channels or passageways 12 which extend within an intermediate portion of the reactor 10, the fins 16 terminating about one foot above the distributor grid 11 and about one foot or more below the top of the tubes 15 as shown in Figure 1. For simplicity, the abutting vertical edges of the fins 16 are not shown in Figure 1 of the drawings.

By this construction of finned tubes, we obtain an intermediate zone comprising channels 12 with the catalyst in a dense turbulent suspended phase. In an upper portion of the reaction zone is a finless section 12a and in a lower portion is another finless section 12b. These finless sections permit cross-mixing of catalyst to maintain uniform suspension within the columns of catalyst in the channels 12 whereas the elongated partitions prevent top-to-bottom mixing of the catalyst.

The upper ends of tubes 15 are welded to headers 18 which are preferably melon-shaped to allow for differential expansion and from which coolant fluids are discharged by conduits 19 looped to provide for up-and-down movement of headers 18. The coolant fluid is preferably water which is maintained under such pressure as to boil at a temperature about 50° below the conversion temperature, but it should be understood that other known coolant fluids, such as molten fused salts and the like, may be used.

Above the reaction zone in vessel 10 is a catalyst disengaging zone or settling space 20 and in the upper part of this space one or more cyclone separators 21 is mounted for separating entrained solids from gases which are introduced thereto through line 22 and removed therefrom through line 23. The solids recovered in the cyclone separator or separators are downwardly withdrawn through dip leg 24 which extends into finless section 12a in order that the solids may be uniformly admixed with catalyst therein and distributed thereby into compartments 12.

The use of this reactor assembly will be described in the process for effecting synthesis by contacting a hydrogen-carbon monoxide gas mixture with a promoted iron catalyst. The invention is not limited, however, to this specific catalyst nor to the conversion conditions hereinafter described in connection therewith.

The invention is particularly applicable to promoted catalyst of the iron type, such, for example, as the so-called ammonia synthesis catalyst or catalyst produced by reducing and conditioning iron oxides which in turn may be relatively pure oxides or oxides obtained by the roasting of certain natural magnetite ores. Alkali metal promoters such, for example, as $Na_2CO_3$ or $K_2CO_3$ shall be used in amounts in the range of about 0.1 to 2%. Since no invention is claimed in the catalyst composition per se, further description thereof is unnecessary.

The particle size distribution of the iron catalyst is of considerable importance for obtaining proper fluidization in each of the multiplicity of vertical passageways. About 5 to 10%, but not more than 20%, of the particles should be less than 40 microns in diameter, i. e. should pass a 325 mesh screen. The bulk of the catalyst should have a particle size in the range of about 20 to 200 microns and a typical particle size distribution may be substantially as follows:

| Particle Size—Microns | Wt. Percent |
|---|---|
| 20-45 | 20 |
| 45-75 | 25 |
| 75-150 | 45 |
| 150-200 | 10 |

The amount of catalyst required for the synthesis reaction (which may be about 500,000 pounds in a plant for producing about 5,000 to 6,000 barrels per day of oil and about 300,000 pounds per day of organic chemicals) may be initially introduced in gaseous suspension through line 26 and the conveyor gas discharged through line 23. The reactor may be brought to temperature by preheating gases blown through the reactor or by employing heating fluids instead of cooling fluids in the heat transfer system. After the catalyst has been positioned and conditioned in accordance with known procedure, the catalyst being constantly maintained in fluidized condition by employing a superficial vertical gas velocity of the order of .2 to 2 feet per second, preferably about .5 to 1 foot per second, the synthesis charging stock gas is introduced through line 26 and passed vertically through the reactor at said superficial velocity at a temperature in the range of about 600° to 680° F., under a pressure of about 250 to 500 p. s. i. g., e. g. about 400 p. s. i. g. The products of conversion, after separation of fines in cyclone 21, are conveyed by line 23 to a product recovery system which may be of any conventional type and which requires no detailed description.

The catalyst fines which are formed partly by erosion, and partly by disintegration, are recovered to a considerable extent in cyclone 21 and returned by dip leg 24 for uniform distribution into the separate channels 12 into which the reactor is divided. At the lower end of the reactor the hydrogen partial pressure may be of the order of 200 to 250 p. s. i. or more, while at the upper end of the reactor, the hydrogen partial pressure may be below 200 p. s. i., i. e. of the order of about 100 p. s. i. g. The finned tubes which form separate channels 12 for the fluidized catalyst serve the important function of preventing top-to-bottom circulation of the catalyst between these two zones. The fins 16 also provide much surface area for any wall effects which may promote conversion and insure a maximum utilization of carbon monoxide for the production of hydrocarbons and chemicals. The fins also increase the effectiveness of heat transfer from the fluidized solids to the coolant within the tubes.

While a specific example of our invention has been set forth in considerable detail, it should be understood that the invention is not limited thereto. Reactors may be of various sizes and shapes, equivalent headers may be employed for those specifically described, the size, spacing and geometric arrangement of the tubes and channels may be modified to meet the requirements of any particular situation in a manner which will be apparent to those skilled in the art from the above description.

We claim:

A contacting and heat-exchanging apparatus comprising in combination an elongated chamber having an inlet at the lower end thereof and an outlet at the upper end thereof, a multiplicity of substantially vertical and parallel tubes geometrically spaced throughout the cross-sectional flow area of the said chamber, radial fins in symmetrical array about an intermediate portion of the length of each of said tubes, the outer edges of the said fins being juxtaposed with corresponding fins on adjacent tubes to form a plurality of separate, elongated, open-ended compartments bounded by at least three pairs of contiguous fins of adjacent tubes, means for passing a heat-exchange fluid upwardly through said tubes including a lower coolant header and a plurality of upper coolant headers fixed to groups of said tubes, a rigidly fixed manifold for said upper coolant headers, a looped conduit between each of said upper headers and said manifold, said lower coolant header comprising essentially an annular supply ring adjacent the inner wall of said chamber and a plurality of substantially parallel manifold tubes spaced equidistant from each other and having their ends terminating in said supply ring, a distributor grid means supported by the wall of said chamber and extending across the chamber below the lower limits of said fins and above the inlet of said chamber and centrifugal gas-solids separator means above the level of said upper coolant headers having a gas outlet connected to the outlet at the upper end of the chamber and a solids outlet extending within the chamber to a level below that of said upper coolant headers.

KAROL L. HUJSAK.
MYRON B. KRATZER.
RICHARD MUNGEN.

REFERENCES CITED

The following references are of record in the file of this patent:

UNITED STATES PATENTS

| Number | Name | Date |
|---|---|---|
| 2,185,931 | Simpson et al. | Jan. 2, 1940 |
| 2,213,622 | Carraway | Sept. 3, 1940 |
| 2,273,865 | Houdry | Feb. 24, 1942 |
| 2,434,537 | Barr et al. | Jan. 13, 1948 |
| 2,453,740 | Becker | Nov. 16, 1948 |
| 2,475,025 | Huff | July 5, 1949 |
| 2,488,406 | Hirsch | Nov. 15, 1949 |
| 2,500,516 | Carpenter | Mar. 14, 1950 |
| 2,500,519 | Clark | Mar. 14, 1950 |
| 2,518,270 | Barr | Aug. 8, 1950 |